July 17, 1956

W. E. BELCHER, JR 2,755,020

MEASURING APPARATUS

Filed Oct. 16, 1951

*INVENTOR.*
WALLACE E. BELCHER JR.

BY *Arthur H. Swanson*

ATTORNEY.

July 17, 1956  W. E. BELCHER, JR  2,755,020
MEASURING APPARATUS
Filed Oct. 16, 1951  6 Sheets-Sheet 2

INVENTOR.
WALLACE E. BELCHER JR.
BY Arthur H. Swanson
ATTORNEY.

July 17, 1956 W. E. BELCHER, JR 2,755,020
MEASURING APPARATUS
Filed Oct. 16, 1951 6 Sheets-Sheet 3

INVENTOR.
WALLACE E. BELCHER JR.
BY
Arthur H. Swenson
ATTORNEY.

July 17, 1956  W. E. BELCHER, JR  2,755,020
MEASURING APPARATUS

Filed Oct. 16, 1951  6 Sheets-Sheet 4

FIG. 9

INVENTOR.
WALLACE E. BELCHER JR.

BY Arthur H. Swanson
ATTORNEY.

July 17, 1956     W. E. BELCHER, JR     2,755,020
MEASURING APPARATUS Filed Oct. 16, 1951     6 Sheets-Sheet 5

*INVENTOR.*
WALLACE E. BELCHER JR.
BY
ATTORNEY.

July 17, 1956 W. E. BELCHER, JR 2,755,020
MEASURING APPARATUS
Filed Oct. 16, 1951 6 Sheets-Sheet 6

*INVENTOR.*
WALLACE E. BELCHER JR.
BY
ATTORNEY.

United States Patent Office 2,755,020
Patented July 17, 1956

2,755,020

MEASURING APPARATUS

Wallace E. Belcher, Jr., Bala Cynwyd, Pa., assignor to Minneapolis-Honeywell Regulator Company, Minneapolis, Minn., a corporation of Delaware Application October 16, 1951, Serial No. 251,518

16 Claims. (Cl. 235—61)

The general object of the present invention is to provide improved apparatus for use in rapidly and accurately measuring a conjoint action or effect of a plurality of separately measurable, variable primary quantities.

For example, the invention is well adapted for use in measuring the weight rate of air or other gas flow through a conduit, and in such case the separately measured primary quantities are the pressure, specific gravity or density, volumetric flow rate, and temperature of the gas flowing through the conduit. In accordance with the present invention, each of the primary quantities is preferably measured by a separate self-balancing measuring apparatus comprising a separate circuit network including electronic amplifier and motor drive elements. In consequence, each of the primary quantities may be measured continuously and with accuracy and great rapidity, so that accurate simultaneous measurements of the different primary quantities may be made and compared and/or related.

As is well known, the weight rate of flow of air through a conduit may be determined by the following equation:

$$w = \frac{(ap)(bs)(cv)}{dt}$$

The foregoing equation may also be written as follows:

$$\frac{w}{e} = \frac{(p)(s)(v)}{t}$$

In the foregoing equations, $w$ represents the weight of gas flowing through a conduit, $p$ represents the conduit gas pressure, $s$ represents the specific gravity of the gas in the conduit under standard conditions, $t$ represents the conduit gas temperature, and $v$ represents the volume of gas flowing per unit of time. In the equation as first written, $a$, $b$, $c$, and $d$ are constants having values dependent upon the particular measuring units, which units may be selected as conditions of operation make desirable. In the second form of the equation, $e$ represents the effective conjoint value of said constants $a$, $b$, $c$, and $d$. By way of example, and to facilitate the explanations made herein, it will be assumed that $w$ may represent the weight of gas flowing in pounds per minute, $p$ may represent the absolute gas pressure in pounds per square inch, $t$ may represent the absolute temperature of the gas in degrees Kelvin, and $v$ may represent the volumetric rate of gas flow in cubic feet per minute.

A primary object of the present invention is to provide means for measuring the separate primary variable quantities, i. e., pressure, volume, temperature, and specific gravity, in such linear quantity terms or units as to facilitate the solution of the foregoing equation in a commercially available computing or statistical instrument. A well known, commercially available, statistical instrument which may be employed is adapted to compute the value of the quantity $w$ rapidly and almost instantaneously following the insertion into the instrument of data cards, each having holes or notches punched in predetermined separate portions of the card so as to represent the arithmetical values of each of the quantities $t$, $v$, $p$, and $s$ in the corresponding punched portions of the card.

A specific but practically important object of the invention is to effect the measurement of each of the variables $t$, $v$, $p$, and $s$ in such a manner that the instrument may "see," and take proper account of, the digits in the decimal number which represents and indicates the value of each variable established by each measurement thereof. Each punched card fed into the statistical instrument may control the resulting computing operation of the instrument by effecting the energization of suitable relay circuits. For example, photocells may be energized by light transmitted through the punched holes in each control card, and the energized photocells may establish electric computing circuits including electronic circuit elements.

A still more specific object of the invention is to provide apparatus for effecting the measurement of each of the equation components or independent variables in such a manner that the control impulses or signals causing the statistical instrument to effect the computation may be developed by the measuring devices themselves without the intervention of a punched card.

Another specific object of the invention is to provide apparatus of the character specified with means for exhibiting illuminated decimal numbers representing the measured values of the various independent variables.

A practical advantage of the invention is that it permits the measurements of the primary variables to be made by existing commercially available self-balancing measuring instruments, and involves little or no change in the latter. Thus, in a preferred form of the invention diagrammatically illustrated herein by way of example, each of the primary variables is measured by a corresponding self-balancing measuring unit, individual to that variable, and comprising a potentiometer bridge circuit associated with a source of voltage varying in predetermined proportion with the variation in the primary variable which that unit measures, said bridge circuit being normally balanced, but being unbalanced by changes in the quantity measured. When the bridge circuit is thus unbalanced, an electric current signal is produced and electronically amplified, and is used to actuate a reversible electric motor for operation in the direction and to the extent required to rebalance the bridge circuit.

For the solution of the foregoing equation in a simple, commercially available statistical instrument, it is practically essential that the measured values of the primary quantities should be represented, or expressed, by multi-digit numbers varying in linear proportion with the value of the quantity measured. When the effect directly measured does not vary in linear proportion with variations in the value of the primary variable represented by the measurement, compensating provisions may be used to make the number representing the measured value of the primary variable vary in linear proportion with the value of the latter, and not in linear proportion to the effect directly measured.

In the preferred form of the present invention illustrated herein, a motor in each instrument angularly adjusts an apertured control disc in linear accordance with the varying value of the particular quantity measured. In regular operation, the angular displacement of the control disc from its zero position at all times directly indicates the actual value of the quantity measured. Light is transmitted from a stationary source or sources through different control disc apertures in different angular positions of the disc, thereby to selectively energize electrical circuits which indicate the different disc positions and produce corresponding control effects. The selectively energized electrical circuits may be used to actuate a known form of card punching machine to punch holes in data cards which indicate the values of the quantities measured and which may be inserted in and control the operation of a statistical instrument. Alternatively, the selectively energized electrical circuits may be directly connected to control apparatus included in the statistical machine, and may directly control the operation of the latter.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
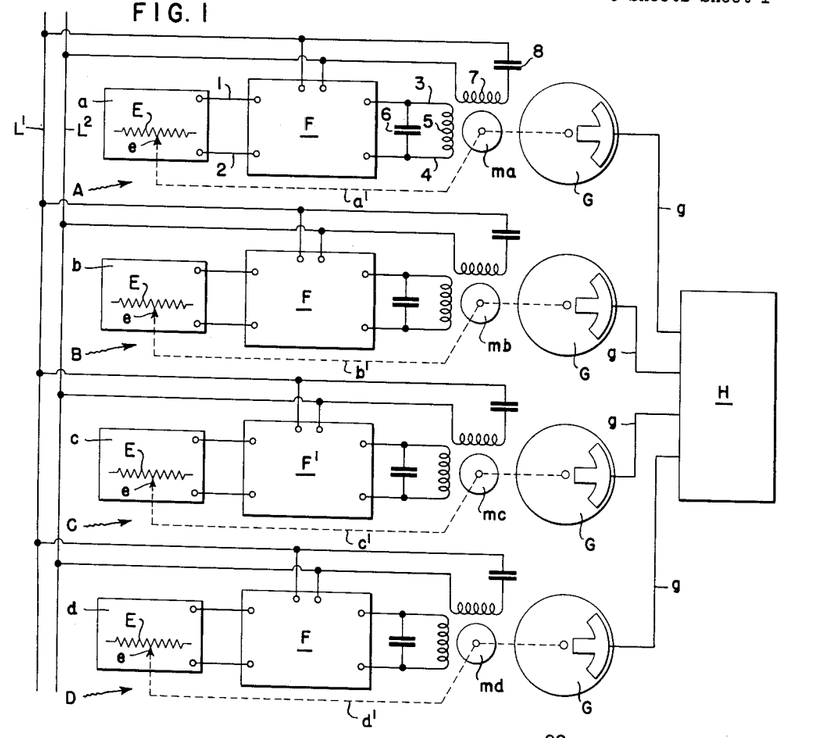
Fig. 1 is a diagrammatic representation of an embodiment of the invention.

In the arrangement shown diagrammatically in Fig. 1, A, B, C, and D represent measuring and indicating units provided for separate use in respectively measuring the above mentioned different primary variables $p$, $s$, $v$, and $t$ which collectively determine the weight rate of gas flow through a conduit. Each of said measuring units is shown as comprising a measuring mechanism $a$, $b$, $c$, or $d$, respectively, including a slide wire resistor E engaged by a slider contact $e$ which is automatically adjusted along the slide wire to rebalance the measuring circuit when the latter is unbalanced by a variation in the value of the primary variable measured by the unit. As shown, the slider contact $e$ associated with the measuring unit A is rebalanced by a reversible motor $ma$, operatively connected to the slider contact by a link $a'$. When any one of the measuring units B, C, or D is unbalanced, the slider contact $e$ engaging the corresponding slide wire E is similarly rebalanced by the corresponding reversible rebalancing motor $mb$, $mc$, or $md$.

When any of the measuring units A, B, C, or D is unbalanced, the corresponding motor $ma$, $mb$, $mc$, or $md$ is energized for operation by means of a voltage and motor drive electronic amplifier F or F′ individual to the unit. Each of the measuring mechanisms $a$, $b$, and $d$ is arranged to develop a D. C. output signal, and is associated with an amplifier F including a converter for converting the developed D. C. signal into an A. C. signal prior to its amplification. The measuring mechanism $c$ is arranged to develop an A. C. output signal, and the associated amplifier F′ differs from the amplifiers F in that it includes no converter. Each of the amplifiers F and F′ has its input terminals connected by conductors 1 and 2 to the corresponding measuring mechanism output, and has output conductors 3 and 4 connected to the terminals of the control winding 5 of the corresponding motor $ma$, $mb$, $mc$, or $md$. As shown, each winding 5 is shunted by a condenser 6. Each of the motors includes an individual power winding 7 which is connected across alternating current supply conductors L′ and L² in series with a condenser 8 individual to that power winding. As diagrammatically shown, each of the amplifiers F and F′ has energizing connections to the supply conductors L′ and L².

Each of the measuring mechanisms $a$, $b$, $c$, and $d$ is actuated upon, and in predetermined proportion to, each change in the quantity measured by the corresponding measuring unit, so as to produce a corresponding rebalancing effect on the measuring unit. As shown, each of the motors $ma$, $mb$, $mc$, and $md$ also adjusts an individual control element G in, and in accordance with the extent of, each rebalancing operation. As shown, each of the elements G is in the form of a rotatable disc, shown in Fig. 5, which is rotated by the corresponding motor at an angular speed which may be the same as the angular speed of the motor or may be in predetermined relation thereto, as conditions make desirable. As shown diagrammatically in Fig. 1, each control device G is connected through electrical conductors included in an individual cable $g$ to a device H, to which the numerical values of the quantities measured by the corresponding measuring units A, B, C, and D are transmitted. In some cases, as already indicated, the instrument H may be a statistical or electronic computing instrument directly providing a measure of the weight rate of gas flow through a conduit. Alternatively, the instrument H may be a card punching instrument which transfers the numerical data received in code form to cards which are fed into a statistical instrument of the electronic computer type.

The various measuring units A, B, C, and D may take various forms, and each measuring unit must be of a character suitably related to the measured effect or condition. Thus, for example, the effects measured in determining the pressure and the specific gravity of the gas moving through the conduit vary in linear proportion to the pressure and specific gravity, respectively. Ordinarily, the effect directly measured to determine the volumetric rate of flow through the conduit is a force proportional to the second power of the volumetric rate of flow. When the temperature of the flowing gas is measured by means responsive to variations in thermocouple voltage or current, the quantity measured includes one component varying in proportion to the first power, and a second component varying in proportion to the second power, of the measured temperature. In measuring the volumetric rate of gas flow, or the temperature of the flowing gas, it is necessary, therefore, to provide a compensation for the non-linear character of the effect directly measured, which compensation is not needed in measuring the pressure and specific gravity of the flowing gas.

As previously indicated, the measuring unit A is employed to measure the static gas pressure in a conduit 10. In the form diagrammatically shown in Fig. 2, the means for measuring the static gas pressure is a Bourdon tube 11 in the form of a spiral. The inner end of the spiral tube 11 is anchored in a stationary supporting member 11a, and is in free communication through a pressure transmitting capillary tube 12 with the conduit 10 through which the gas flows. The free end of the Bourdon tube 11 is shown as connected by a link 13 to a slider contact 14 to move the latter along a slide wire resistor 15 constituting a voltage divider element. A battery 18 or other source of unidirectional current has one terminal connected to one end of the resistor 15, and has its second terminal connected to the other end of the resistor 15 through a variable resistor 19 which may be adjusted to compensate for variations in the voltage of the battery 18.

Figure 2:
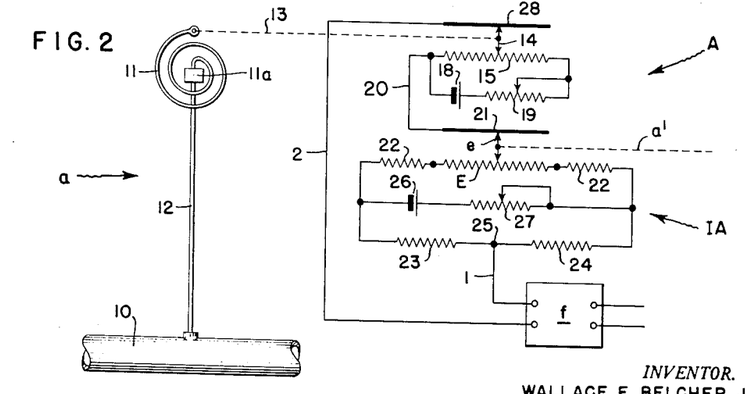
Figs. 2, 3, and 4 diagrammatically illustrate characteristic features of different ones of the measuring units shown in Fig. 1.

One end of the voltage divider resistor 15 is connected by conductors 20 and 21 to the associated slider contact e. The latter is adjusted along the associated slide wire resistor E by the motor ma of Fig. 1, upon and in accordance with each change in the pressure of the gas in the conduit 10. When the motor ma is energized, it produces a movement of the contact e along the resistor E. As shown, the contact e is adjusted by the motor ma through the operating link or element a'. The contact e acts as a bridging contact to connect the point of the slide wire resistor E which the contact e engages to the conductor 21 which is mounted alongside the resistor E. The slide wire resistor E forms part of a split potentiometer bridge circuit IA of well known type. The circuit IA includes a resistance branch including the slide wire resistor E and other resistors 22, a second resistance branch in parallel with the first mentioned branch and including resistors 23 and 24 at each side of an intermediate point 25, and an energizing branch in series with each of the resistance branches. The energizing branch includes a battery 26, or other source of unidirectional voltage, and a variable resistor 27 which may be adjusted to compensate for changes in the voltage of the battery 26. The slider contact 14 serves as a bridging contact to connect the point of the voltage divider resistor 15 which it engages to an adjacent portion of a conductor 28 alongside the resistor 15. The conductor 28 and thereby the slider contact 14 are connected to the point 25 in the bridge circuit IA through a converter element f forming a part of the amplifier F associated with the measuring unit A. As shown, the converter f has its input terminals connected to the bridge circuit point 25 and to the conductor 28 by the conductors 1 and 2, respectively, which are shown in Fig. 1 as connecting the measuring mechanism a to the amplifier F.

In operation, the Bourdon tube 11 and voltage divider resistor 15 cooperate to maintain a unidirectional voltage between the slider contact e, associated with the bridge circuit IA, and the point 25 of that circuit, which voltage varies in linear proportion with the conduit gas pressure transmitted to the Bourdon tube through the tube 12. A change in that pressure results in an adjustment of the slider contact 14. That adjustment varies the voltage between the conductors 21 and 28, and thereby unbalances the measuring circuit. A unidirectional current signal is then transmitted through the conductors 1 and 2 to the converter element f of the amplifier F. That signal is converted into an alternating signal by the converter f. The alternating signal thus developed is amplified in the amplifier F and creates a current flow through the control winding 5 of the motor ma. The electro-magnetic forces to which the rotor of the motor ma is then subjected by the associated windings 5 and 7 set the motor ma into rotation in the direction required to adjust the slider contact e along the slide wire resistor E as needed to make the potential difference between the slider contact e and the bridge point 25 again equal in magnitude to the opposing potential difference between the conductors 21 and 28.

As those skilled in the art will recognize, the apparatus shown diagrammatically in Figs. 1 and 2 responds to a change in the unidirectional voltage between the conductors 21 and 28 just as the apparatus disclosed in the Wills Patent 2,423,540, granted July 8, 1947, responds to a change in the voltage of a thermocouple being measured by the last mentioned apparatus. In view of that fact, and the further fact that the self-balancing potentiometric measuring apparatus disclosed in said patent is well known and is in wide use, no further explanation is needed herein of the manner in which variations in the signal impressed on the amplifier F, associated with the motor ma, produce a rebalancing operation of that motor.

The measuring unit B employed to measure the specific gravity of the flowing gas may comprise apparatus similar to that shown in Fig. 2 and including a means displaced in accordance with specific gravity for positioning the contact 14 in association with a potentiometric bridge circuit and converter like the circuit IA and converter f of Fig. 2.

Figures 3, 4, 5:
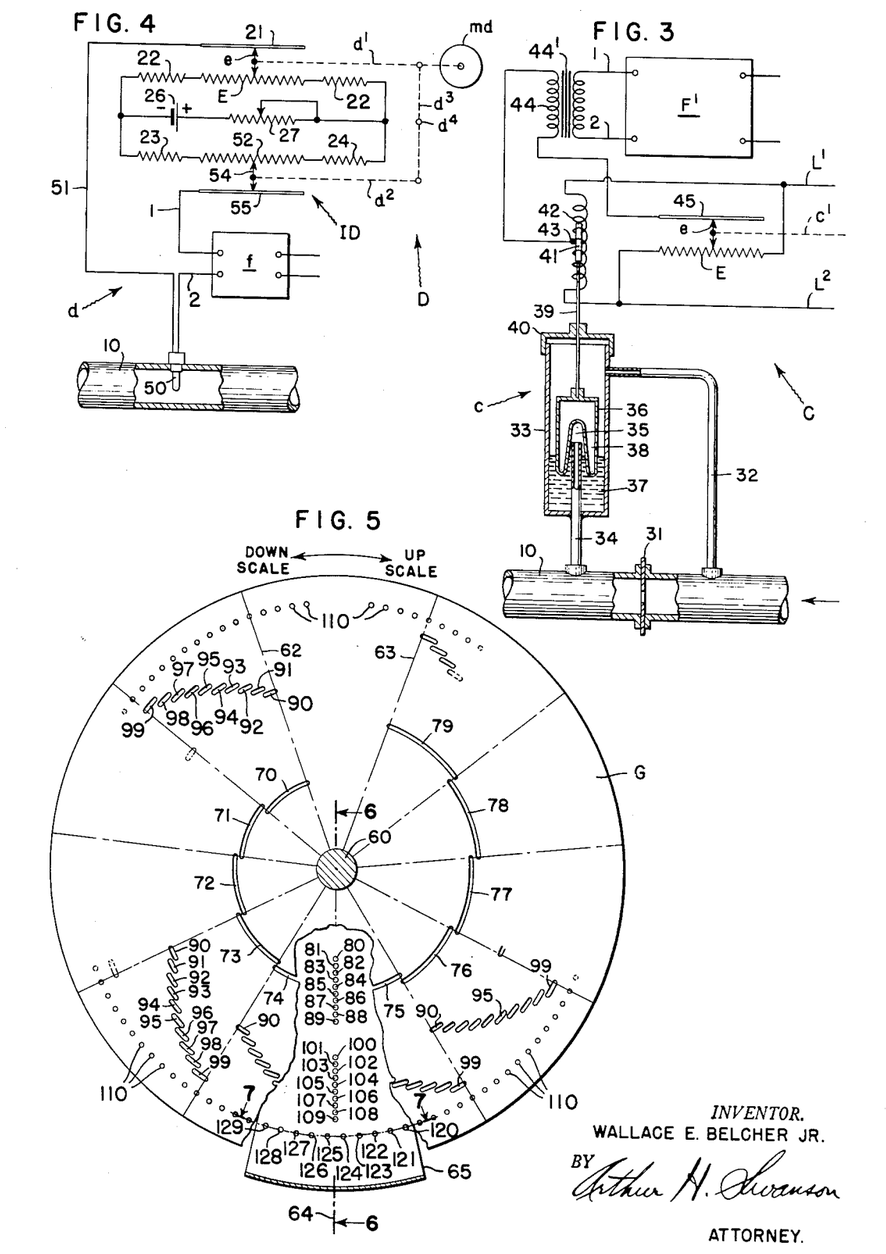
Figs. 5 is an elevation of one of the rotatable control elements shown in Fig. 1.

As is shown in Fig. 3, the measuring unit C directly measures the difference between the pressures in the gas conduit 10 at opposite sides of an orifice plate 31 which extends across the conduit 10 and is formed with a restricted central aperture. In Fig. 3, the arrow indicates the direction of flow through the conduit 10. The upstream portion of the conduit 10 at the up-stream or right-hand side of the plate 31 is connected by a pipe 32 to a float chamber 33 at an upper level, and the portion of the conduit 10 at the down-stream side of the plate 31 is connected to the float chamber 33 at a lower level by a pipe 34. As shown, the pipe 34 extends upward through the lower end wall of the float chamber 33, and has its discharge end portion within and coaxial with the chamber 33. The pipe 34 extends and opens into a central cavity 35, open at its lower end, which is formed in the lower portion of a bell shaped float 36.

The float 36 floats upon a body of liquid 37 partially filling the chamber 33 and in which the annular lower end of the portion 38 of the float 36 is submerged. The liquid 37 may be mercury, and its amount is small enough to prevent the liquid level within the cavity 35 from ever rising as high as the upper end of the pipe 34. An uprising stem 39, having its lower end secured to the upper end of the float 36, extends through the upper end wall of the chamber 33 and through a stuffing box 40 supported by that wall and surrounding the stem 39. The stem 39 carries an armature 41 at its upper end. The annular wall portion 38 of the float 36, which is in contact with the mercury or other fluid, is shaped in a known manner to insure a vertical movement of the float, on a change in the rate of flow through the conduit 10, which is in linear proportion to the velocity of flow through the conduit 10, notwithstanding the fact that the difference between the pressures in the conduit at the up- and down-stream sides of the orifice plate 31 is approximately proportional to the second power of the volumetric rate of flow through the conduit 10.

The armature 41 is axially disposed in a coil 42 connected across the supply conductors L' and L². The midpoint 43 of the coil 42 is connected through a coil or winding 44 to a conductor 45 which is positioned alongside a slide wire resistor E. The latter is connected between the supply conductors L' and L². A slider contact e, in engagement with and adjustable along the slide wire resistor E, connects the point of that resistor engaged by the contact to the adjacent portion of the conductor 45. The bridging contact e is connected by an element c' to the rebalancing motor mc associated with the measuring unit C.

The two halves of the coil 42 form two arms, and the portions of the slide wire E at opposite sides of the point at which said slide wire is engaged by the contact e form the other two arms, of an impedance bridge which is energized by the alternating current supply conductors L' and L². Normally, the position of the contact e along the slide wire E is so related to the position of the armature 41 that the potential at the point 43 is equal to the potential at the point of the bridge resistor E which is engaged by the contact e. Any change in the rate of flow through the conduit 10 which raises or lowers the float 36 unbalances the impedance bridge and creates a current flow through the winding 44 which is of one phase or of the opposite phase, depending upon whether the vertical movement of the float 36 is up or down.

The coil or winding 44 forms the primary winding of a transformer 44' coupling the measuring mechanism c to the amplifier F'. The secondary winding of the transformer 44' has its end terminals connected by the conductors 1 and 2 to the input of the amplifier F', and the alternating current signal impressed on the amplifier F' through the conductors 1 and 2 of Fig. 3 is adapted to control the motor mc, just as the motor ma or mb is controlled by a direct current signal impressed on the corresponding amplifier F through the associated conductors 1 and 2 in the units A and B. The impedance bridge circuit shown in Fig. 3 is similar in form to that disclosed in the Schmitt Patent 2,255,601 of September 9, 1941. The amplifying and motor control circuit through which an impedance bridge of the type shown in Fig. 3 operates the motor $mc$ to effect rebalancing operations is of a type and form disclosed in said Wills patent, and requires no further description or explanation herein.

As will be apparent to those skilled in the art, the impedance bridge shown in Fig. 3, may be substituted, without change, for the potentiometric bridge circuit IA shown in Fig 2, if and when conditions make such a substitution desirable.

Fig. 4 illustrates apparatus for measuring the temperature of the gas moving through the conduit 10, in which the conduit temperature responsive element is a thermocouple 50. The latter has its terminals 51 and 2 connected through a converter $f$ and to a potentiometric bridge circuit ID, just as the output terminals 21 and 2 of the voltage divider are connected through a converter $f$ and to a bridge circuit in Fig. 2. The output voltage and temperature of a thermocouple do not vary in linear proportion, but substantially in accordance with the following equation:

$$E = AT + BT^2 \qquad (1)$$

wherein E equals the thermocouple voltage, T equals the absolute temperature difference between the hot and cold junctions of the thermocouple, and A and B are constants. The constants A and B can be readily determined by experimentation and computation and are well known for standard type thermocouples such as copper-constantan, iron-constantan, and Chromel-Alumel thermocouples. For such thermocouples, the value of the constant A is much larger than that of the constant B, the value of the constant A being of the order of from about 1,000 to about 8,000 times as great as the value of the constant B.

The bridge circuit ID, shown in Fig. 4, differs structurally from the conventional split potentiometer circuit IA, shown in Fig. 2, in that the portion of the bridge circuit branch between the resistors 23 and 24 of Fig. 2, including the fixed point 25, is replaced in Fig. 4 by a non-linear slide wire resistor 52. The circuit ID also differs structurally from the circuit IA in having its resistor 52 connected to the associated converter terminal 1 by a slider contact 54.

In operation as contemplated, the circuit ID differs functionally from the conventional split potentiometer bridge circuit in that, as the slider contact $e$ is adjusted in either direction along the slide wire resistor E by the motor $md$, the slider contact 54 is given adjustments along the slide wire resistor 52 proportional in magnitude, but opposite in direction, to the adjustments of the contact $e$ along the resistor E. As shown, the motor $md$ adjusts the slider contact $e$ through the adjustment element $d'$, and adjusts the slider contact 54 through a linkage shown as comprising an element $d^2$ which is connected to the element $d'$ by a lever $d^3$ pivoted to turn about a fulcrum $d^4$. The contact 54 acts as a bridging contact to connect the point of the slide-wire resistor 52 which it engages to a stationary conductor 55 alongside the resistor 52 and connected at one end to the conductor 1.

With the bridge circuit arrangement shown in Fig. 4, an increase or decrease in the thermocouple voltage unbalances the measuring circuit by respectively increasing or decreasing the potential difference between the slider contact $e$ and the conductor 2. With the indicated polarity of the battery 26 in the circuit ID, an increase or decrease in the thermocouple voltage will energize the motor $md$ for operation in the direction to shift the main slider contact $e$ along the slide wire E to the right or to the left, respectively, as seen in Fig. 4, as is conventional. The rebalancing operation started by an increase or decrease in the potential difference between the slider contact $e$ and the conductor 2 normally continues until the potential difference between the contacts $e$ and 54 is made equal to the then existing voltage of the thermocouple.

In the rebalancing operation, the effect of the adjustment of the contact 54 is to reduce the magnitude of the adjustment of the contact $e$ otherwise required. Thus, for example, when the voltage of the thermocouple 50 increases, the bridge circuit is unbalanced, and the potential difference between the points of the resistors E and 52 engaged by the contacts $e$ and 54, respectively, is less than the voltage between the thermocouple terminals 2 and 51. The resultant adjustment of the contact $e$ to the right increases the potential of the point of the resistor E engaged by the contact $e$. The simultaneous adjustment of the slider contact 54 to the left decreases the potential of the point of the resistor 52 engaged by the contact 54. Both the increase in the potential of the point of the resistor E engaged by the contact $e$, and the decrease in the potential of the point of the resistor 52 engaged by the contact 54, contribute directly to the rebalancing of the measuring circuit.

Therefore, the direct effect of the adjustment of the slider contact 54 is to reduce the extent of adjustment of the slider contact $e$ necessary to rebalance the measuring circuit, following a given increase in the thermocouple temperature and voltage. Because of the different relative resistivities of different longitudinal sections of the resistor 52, the described adjustment of the slider contact 54 not only reduces the magnitude of the rebalancing adjustment of the contact $e$, but also corrects for the non-linearity of the relation between the extent of adjustment of the contact $e$ and the change in the thermocouple temperature resulting in that adjustment.

In order to provide compensation for the non-linear temperature-voltage characteristic of the thermocouple 50, the resistance of the resistor 52 per unit of length progressively increases at a linear rate from its right end to its left end. By this means, perfect compensation is obtainable for a thermocouple having the characteristics shown by the foregoing equation 1.

Figure 6:
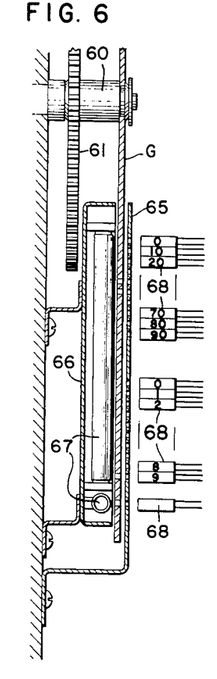
Fig. 6 is a partial transverse vertical section taken on the line 6—6 of Fig. 5 through the control element shown in Fig. 5 and associated apparatus.
Figure 7:
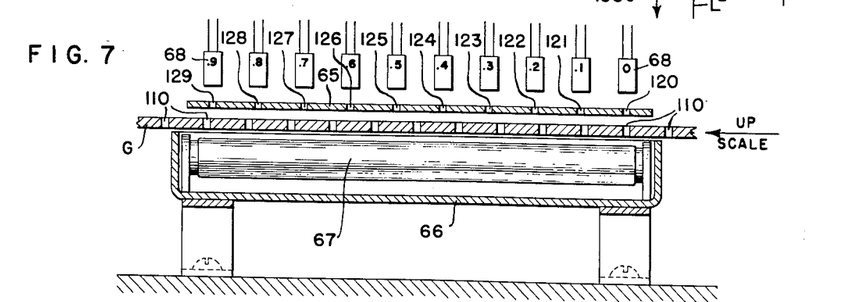
Fig. 7 is a developed section taken on the line 7—7 of Fig. 5.

One of the control discs G of Fig. 1 is illustrated in more detail in Figs. 5, 6, and 7. The four control discs G shown in Fig. 1 may be identical in structure, and the description of the discs G and associated apparatus shown in Figs. 5, 6 and 7 applies to each of the discs G and its associated apparatus of Fig. 1. The disc G, as shown in Fig. 6, is secured to the hub 60 of a gear element 61 through which the rotation of the corresponding motor $ma$, $mb$, $mc$, or $md$ effects its rebalancing operations and gives a proportional rotative movement to the associated control disc G. The disc G is arranged for rotation in a clockwise or a counter-clockwise direction, as seen in Fig. 5, corresponding to an increase or a decrease, respectively, in the quantity measured.

In Fig. 5, the radial lines 62 and 63 on the disc G are the leading and trailing edges, respectively, of a 320° portion of the disc. The line 62 is a zero-scale line, and is made to coincide with the vertical reference line 64 when the value of the quantity to be measured is at a minimum and the disc G has rotated fully in the counter-clockwise or down-scale direction. Similarly, the line 63 is a full-scale line, and is brought to within a fraction of a degree of coincidence with the reference line 64 when the quantity to be measured has reached its maximum measurable value and the disc G has rotated fully in the clockwise or up-scale direction. Suitable mechanical stops, not shown, are provided for so limiting the angular motion of the disc G, which motion, as can be seen from the above description, is limited to slightly less than 320°. This limitation makes the position of maximum up-scale travel of the disc coincide with the highest digital indication which the apparatus is capable of producing, as will be more specifically discussed hereinafter.

The apparatus directly associated with each disc G includes a stationary blinder plate 65 in front, and illuminating means at the back, of a portion of the disc G below its axis. As shown, the illuminating means comprises a reflector box 66 and one or more electric lamps 67 which may well be of the fluorescent type and which have their light emitting portions within said box. As hereinafter explained, the blinder plate 65 is formed with a plurality of apertures in positions to register with apertures in the disc G as the latter moves through different angular positions. A separate light sensitive element 68, which may well be a type IP42 photocell, is held in position to receive light from the reflector box 66, through a particular one of a plurality of light transmitting orifices in the blinder 65, when said one of said orifices is in register with an aperture in the associated disc G. As shown, the light sensitive elements 68 are located adjacent the blinder 65, and the latter is attached to, and supported by, the chassis of the instrument with which the corresponding motor ma, mb, mc, or md and corresponding disc G are associated. There are thirty light transmitting apertures in the blinder plate associated with each disc G, and there is a separate element 68 in register with each blinder orifice. The number shown on each of the elements 68 is the particular digit which is indicated by the apparatus when that element is illuminated.

The aforementioned 320° portion of the control disc G comprises ten similar sectors, each having an angular extent of 32° and being provided with a corresponding one of ten slots 70 through 79. Each of said slots is in the form of a circular arc of slightly more than 32°, and extends throughout its particular sector and slightly into each adjacent sector, as shown. The radii of the different slots 70 through 79 are of progressively increasing lengths so that the leading ends of the various slots 70 through 79 form points along a spiral line. While the disc G is being rotated clockwise through an angle of 32° away from its zero position, the leading end of the slot 70 moves across and clockwise away from the starting line 64, and, throughout that 32° movement, the slot 70 is in register with the aperture or hole 80 in the associated blinder plate 65, and the light sensitive element 68 associated with the aperture 80 receives light transmitted through the slot 70 and aperture 80. The aperture 80 is the uppermost of a vertical row of blinder apertures 80 through 89, each of which is arranged to register with a corresponding one of the slots 70 through 79 as the disc G turns through its full arc of movement. Substantially at the end of the first 32° movement of the disc G from the zero position, the slot 70 passes out of register with the blinder aperture 80, and the slot 71 passes into register with the blinder aperture 81, and so on. As light is thus successively transmitted through the apertures 80 through 89, the light sensitive elements 68, individually associated with the different apertures 80 through 89, are successively energized. The slight overlapping of the slots 70 through 79 is advantageously provided in order to secure positive actuation of the apparatus controlled by the elements 68, as will be explained hereinafter.

If the apparatus disclosed herein is adapted to measure a quantity, the numerical value of which may vary from zero to 99.9 an increase in the value of the quantity from zero to 9.9 will cause the disc G to move through an angle of slightly less than 32° with the slot 70 in register with the blinder aperture 80. During the following 32° movement of the disc G, which occurs as the value of the quantity measured increases to 19.9, the slot 71 will be in register with the aperture 81. Similar further increases in the value of said quantity will be attended by successive movements of the slots 72 through 79 successively into and out of register with the apertures 82 through 89, respectively.

Since the value of the quantity measured increases by ten, or substantially 10% of the total measurable range of the quantity, while each of the slots 70, 71, etc. is in register with the corresponding blinder apertures 80, 81, etc., the slots 70, 71, etc., may be aptly designated as "10% slots." While the value of the quantity measured is increasing from zero to 9.9, successive unit increments of the quantity are measured by a group of slots 90 through 99 in the sector of the disc G including the 10% slot 70.

Each of the slots 90 through 99 is a circular arc of slightly more than 3.2°, and may be referred to as a "1% slot," since it is used in measuring an increment of unity, or substantially 1% of the total value of the quantity measured, as said value increases from zero to its assumed maximum measurable value of 99.9. The 1% slots 90 through 99 in the sector including the slot 70 are at progressively greater distances from the axis of the disc G, so that during the first movement of slightly less than 32° of the disc from its zero position, the 1% slots 90 through 99 in the first sector successively register with the blinder apertures 100 through 109, respectively, just as the 10% slots 70 through 79 successively register with the blinder apertures 80 through 89. Again, an advantageous overlapping of the slots is provided as in the case of the 10% slots.

Each of the ten sectors of the disc including one of the 10% slots 71 through 79 includes a group of 1% slots 90 through 99 identical to the above described group of 1% slots in the sector including the 10% slot 70. As each sector turns through the position in which it embraces the starting line 64, light sensitive elements individually associated with the blinder apertures 100 through 109 are successively illuminated. The ten groups of 1% slots 90 through 99 thus cooperate with the ten apertures 100 through 109 to indicate the successive unitary increases in value of the quantity measured as that value increases from zero to 99.9.

A circular series of one-hundred and nine disc apertures 110, adjacent the periphery of the disc G and spaced 3.2° apart, cooperate with a circular series of blinder apertures 120 through 129, as shown in Fig. 7, to measure each increment of one-tenth, or substantially 0.1% of the total measurable range of the quantity measured, as said quantity varies from zero to 99.9. As is clearly shown in Fig. 7, the angular distance between each two adjacent apertures of the blinder group of 0.1% apertures 120 through 129 is 10% greater than the angular distance between each two adjacent ones of the 0.1% disc apertures 110. In Fig. 7, one of the apertures 110 is shown as in full register with the blinder aperture 120, and none of the other blinder apertures 121 through 129 is in full register with an aperture 110. As in the case of the 10% and 1% disc apertures, however, there is an overlapping effect provided in connection with the 0.1% disc and blinder apertures. This effect is obtained, as shown in Fig. 7, by making the disc apertures 110 sufficiently large so that the blinder apertures on each side of one which is in full register with a disc aperture will be in partial register with other disc apertures. Thus, in Fig. 7, a disc aperture 110 is seen to be in partial register with the blinder aperture 121 on one side of the aperture 120 which is in full register, while a second aperture 110 is in partial register with the aperture 129, the latter being on the other side, numerically speaking, of the aperture 120.

As the disc G is advanced 3.2° clockwise from its position shown in Fig. 7, the nine 0.1% apertures 110 immediately at the left of said one aperture 110 of Fig. 7 are successively brought into register with the blinder apertures 121 through 129, respectively, and a new aperture 110 will register with the aperture 120. A further 0.32° movement of the disc G will bring said one aperture 110 of Fig. 7 into register with the blinder aperture 121. The light sensitive elements 68 of Fig. 7 cooperating with the 0.1% blinder apertures bear numbers indicative of the digital indications which they control.

The arrangement of the 0.1% disc and blinder apertures shown in Fig. 7 may be referred to as a "vernier" arrangement, and it has the advantage of permitting the measurement of individual increments of substantially 0.1% of the full measurable value of the quantity measured to be made with the use of only one-hundred and nine disc apertures 110. In consequence, the apertures 110 may be suitably spaced apart without requiring an undue increase in the diameter of the disc G.

The 0.1% blinder apertures 120 through 129 are positioned in the blinder 65 relative to the other apertures so that a 0.1% disc aperture 110 is in register with the zero blinder aperture 120 when the zero sector line 62 or any of the other sector lines is coincident with the reference line 64. As shown in Fig. 5, this result is achieved by locating the apertures 124 and 125 on either side of the line 64. When the blinder apertures 120 through 129 are properly located in this position, the coincidence of a sector line with the line 64 will cause an aperture 110 to register sufficiently with the zero blinder aperture 120 to actuate the corresponding element 68, thereby causing the apparatus to provide the proper zero 0.1% indication.

For the purpose of simplifying the description of the present invention as given herein, the disc and blinder apertures have been shown in Figs. 5 and 7 in such relative positions that full registration occurs between a disc aperture 110 and the zero 0.1% blinder aperture 120 whenever a sector line on the disc G coincides with the reference line 64. In practice, however, it may be desirable to shift the 0.1% blinder apertures as a group slightly to the left from their positions shown in Fig. 7 in order to assure that the overlapping action previously described will not cause sufficient registration between an aperture 110 and the aperture 121 to produce an indication of other than zero for the 0.1% group when such an indication is required. To this end, it may be found desirable in practice to provide means for permitting slight adjustments of the group of 0.1% blinder apertures 120 through 129 relative to the instrument frame and to the other blinder apertures so as to assure that, upon coincidence between a sector line and the reference line 64, the blinder aperture 120 will be sufficiently in register with an aperture 110 to provide a zero 0.1% indication while there will not be sufficient registration between any aperture 110 and any other blinder aperture to cause other than a zero 0.1% indication to be given. Such adjustments will also make it possible to prevent improper indication for any and all other positions of the disc G.

In a similar manner, it may be found desirable to provide means for permitting slight adjustments of the 10% group and of the 1% group of blinder apertures, relative to each other and to the 0.1% group and instrument frame, away from the positions shown by way of illustration in Figs. 5 and 7, thereby to assure that only the proper elements 68 will be actuated and that only the proper digital indication will be provided at any given time. For example, when the leading edge of the sixth sector coincides with the reference line 64 as shown in Fig. 5, the blinder apertures should be positioned relative to the disc apertures in such a manner that the proper indication of 50.0 will be given.

The four leading 0.1% disc apertures 110 which lie to the right of the line 62 in Fig. 5, and the four trailing apertures which lie to the left of the line 63 in the last mentioned figure, are provided to cause the proper operation of the 0.1% vernier arrangement when the disc G is in positions adjacent its zero-scale and full-scale positions, respectively. Thus, it is believed to be apparent in the light of the foregoing description that the four leading apertures 110 cooperate with the blinder apertures 126 through 129 to assist in providing 0.1% indications during the times in which the aperture 110 located on the line 62 assumes positions between the line 64 and the blinder aperture 129. Similarly, the four trailing apertures 110 cooperate with the blinder apertures 120 through 123 during the times in which the aperture 110 located on the line 63 assumes positions between the aperture 120 and the line 64.

As was noted previously herein, the disc G is limited in its rotation to an angle of somewhat less than 320°. Specifically, the disc G reaches its position of maximum rotation in the up-scale, clockwise direction when the line 63 moves to within 0.32° of the line 64. This is done in order to prevent rotation of the disc G past the position in which the apparatus provides its highest possible indication: namely, 99.9. Accordingly, at its up-scale limit of rotation, the disc G causes the fifth aperture 110 from the line 63 to be in operative registration with the 0.9 blinder aperture 129, further up-scale rotation of the disc G which might affect this condition being prevented.

As will be apparent upon referring to the disc G of Fig. 5 in the light of the foregoing description, certain of the disc apertures 90 through 99 and 110 have not been shown in Fig. 5. The omitted apertures have purposely been so omitted from the drawing in order not to complicate the latter unduly.

Figure 8:
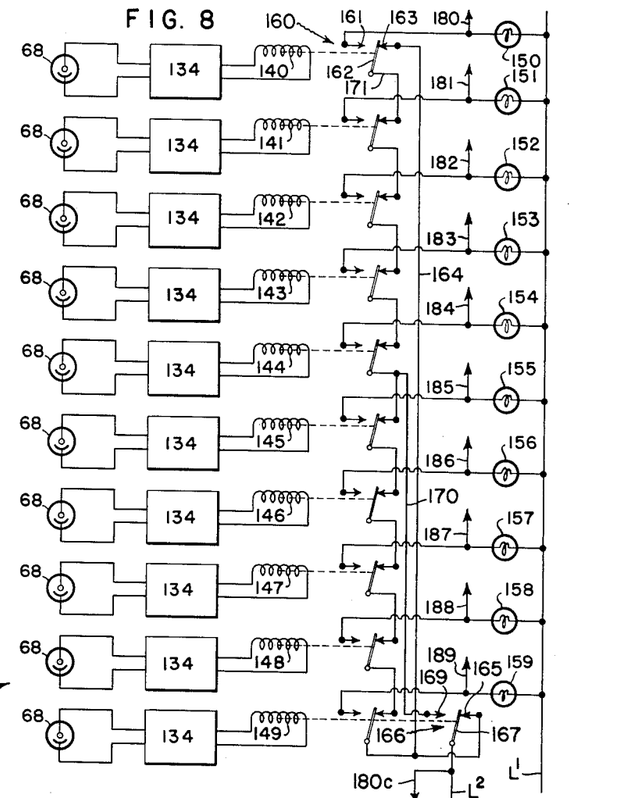
Fig. 8 is a semi-block diagram illustrating a control and indicating circuit arrangement which may be used with the apparatus as shown in Figs. 5, 6, and 7.
Figure 9:
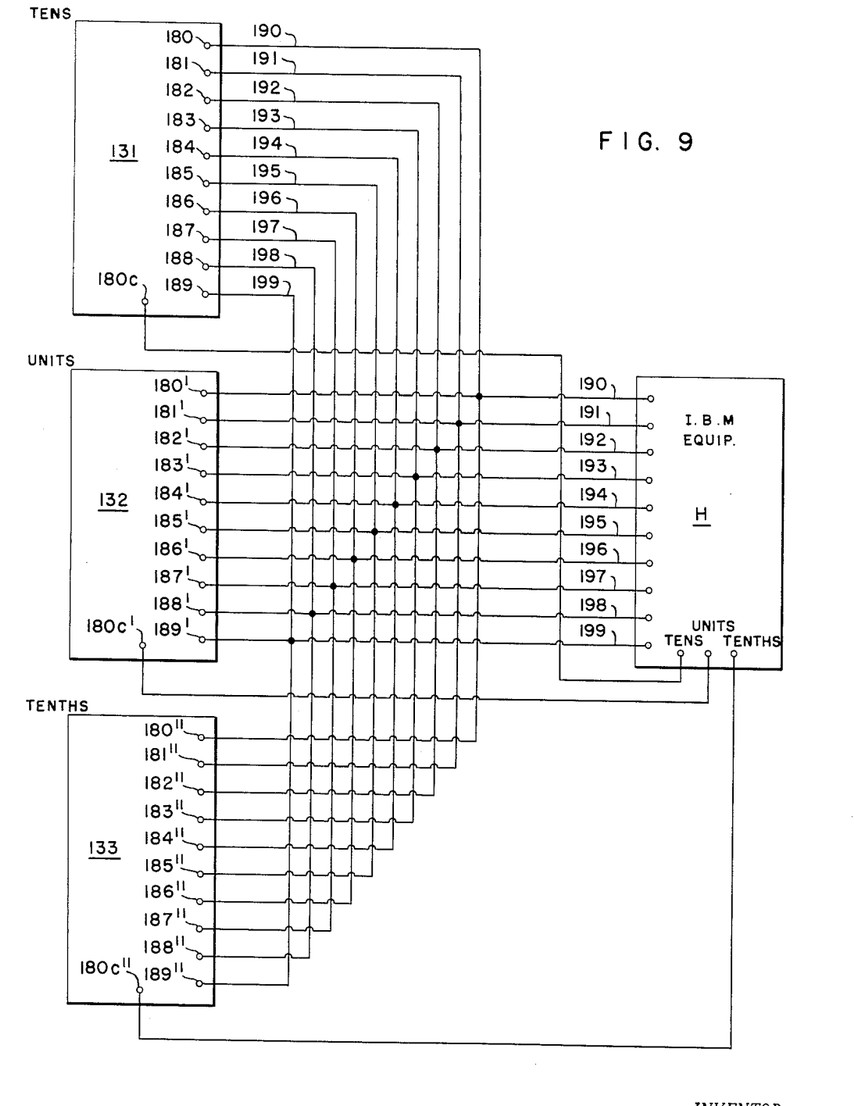
Fig. 9 is a diagram illustrating a digital signal transmitting circuit arrangement.

Fig. 8 illustrates a signal transmitting and indicating unit 131 comprising a group of ten photocells 68 associated with the 10% group of blinder apertures or orifices 80 through 89 of Fig. 5. Similar units 132 and 133, each including ten elements 68 and respectively associated with the 1% blinder orifices 100 through 109, and with the 0.1% vernier blinder orifices 120 through 129, are shown in Fig. 9 in association with the unit 131 and with the previously mentioned instrument H of Fig. 1. A desirable operative arrangement for the unit 131 is diagrammatically shown in Fig. 8, and the units 132 and 133 may be identical to the illustrated unit 131. Each element 68 shown in Fig. 8 is connected to, and actuates, a corresponding relay element included in a group of ten relay elements 140 through 149, and each of said relay elements controls the energization of a corresponding one of a group of ten indicating and control circuits. The ten indicating and control circuits respectively include and control the energization of electric lamps 150 through 159 and other indicating or control devices.

As diagrammatically shown in Fig. 8, each of the relay elements 140 through 149 is individually controlled and energized by a corresponding one of the ten elements 68 through an individual amplifier 134. In Fig. 8, the energization and deenergization of each of the devices 150 through 159 is directly effected by reverse adjustments of an associated one of ten relay switches 160. The adjustment of a particular switch 160 which energizes the associated one of the devices 150 through 159 is directly due to the energization of the particular one of the relays 140 through 149 associated with the device energized, but the deenergization of the associated one of the devices 150 through 159 is not necessarily accompanied by the deenergization of the particular associated relay, as is hereinafter explained.

In the contemplated operation of the apparatus shown in Figs. 1 through 8, and as described hereinbefore, the elements 68 are successively energized and deenergized, but the energization periods of adjacent elements 68 overlap. Thus, for example, the device 68 is energized and energizes the relay 143 after the energization, and prior to the deenergization, of the device 68 which energizes the relay 142. Moreover, the device 68 which, by its energization, energizes the relay 143, is not deenergized until after the energization of the device 68 which energizes the relay 144. This insures that the deenergization of each of the series of devices 150 through 159 will not precede the energization of the device of the series next to be energized. This is desirable, since the effect of the deenergization of one device significantly before the energization of the succeeding device might result in a lack of value indication of the measured quantity. To avoid that result, the associated disc and blinder apertures are so arranged that adjacent binder apertures may transmit light simultaneously during overlapping portions of the successive light transmitting periods of the apertures.

In the apparatus shown, the deenergization of each of the devices 150 through 159, prior to the energization of the next of those devices to be energized, is prevented by the circuits through which the various switches 160 connect the devices 150 through 159 to a source of current which, as diagrammatically shown, comprises alternating current supply conductors L' and L². As shown in Fig. 8, one terminal of each of the devices 150 through 159 is connected to the supply conductor L', and the second terminal of each of said devices is connected to the normally open stationary contact 161 of the associated switch 160. The movable switch contact or blade 162 of each switch 160 is moved into engagement with the corresponding stationary contact 161 by the energization of the particular one of the relays 140 through 149 directly associated with that switch and associated with the particular one of the devices 150 through 159 energized by the energization of that relay. The blade or movable contact 162 of each of the switches 160 is normally biased for movement out of engagement with the adjacent contact 161, and for movement into engagement with a normally closed stationary contact 163. The uppermost stationary contact 163 of Fig. 8 is normally connected to the supply conductor L² through a conductor 164.

As shown, the conductor 164 is normally connected to the supply conductor L² through a normally closed stationary contact 165 of a switch 166 and the movable blade 167 of this switch, the blade 167 being biased for movement into the position in which it engages the contact 165. When the relay 149 is energized, it not only effects an adjustment of the switch blade 162 of the associated switch 160, but it also moves the movable contact 167 of the switch 166 out of engagement with the contact 165 and into engagement with a normally open stationary contact 169. The engagement of the contacts 167 and 169 establishes a circuit through which the device 150 can be energized when the energization of the relay 140 pulls the movable contact 162 of the uppermost switch 160 into engagement with the contact 161 connected to one terminal of the device 150. The circuit thus established by the adjustment of the switch 166 when the relay 149 is energized includes a conductor 170. The latter connects the stationary contact 169 of the switch 166 to one of the switch connecting conductors 171 between the uppermost and lowermost of the switches 160 shown in Fig. 8. As shown, the movable switch blade 162 of each of the switches 160, directly actuated by one or another of the relays 140 through 148, has its movable switch blade connected by a conductor 171 to the stationary contact 163 of the subjacent switch 160. When the relay 149 is deenergized, the switch blade 167 connects the conductor 164 to the supply conductor L². As will be apparent, the conductor 164 connects the movable switch blade of the lowermost switch 160 to the stationary contact 163 of the uppermost switch 160, just as each of the conductors 171 connects the switch blade of one switch 160 to the stationary contact 163 of an adjacent switch 160.

It will be noted that the circuit connections shown in Fig. 8 insure that, in the event that one or more of the relays 140 through 149 becomes energized at any instant, only one of the devices 150 through 159 will be energized: that is, the relay associated with the highest digit. The one device which will be energized in the case where more than one of the relays 140 through 149 are simultaneously energized is that one of the devices 150 through 159 which is associated with the lowermost of the particular relays energized. In the case of the simultaneous energization of the relays 149 and 140, this means that relay 140 would take precedence, resulting in the energization of solely the device 150.

In Fig. 8, the indicating and control elements of the unit 131 are shown as including ten terminals 180 through 189 which may be branches of the portions of the conductors connecting each of the lamps 150 through 159, respectively, to the appropriate stationary contact 161 of the associated switch 160. In Fig. 8, 180c represents a branch from the switch 166. In Fig. 9, the terminals 180 through 189 and 180c of the unit 131 are shown as associated with similar groups of terminals 180' through 189' and 180c', and 180" through 189" and 180c", included in units 132 and 133, respectively. In Fig. 9, each of the device terminals 180, 180' and 180" is connected to a common input terminal 190 of the instrument H. Similarly, each of the terminals 181, 181' and 181" is connected to the terminal 191 of the instrument H. Also, each group of corresponding terminals 182, 182' and 182", and 183, 183', 183", etc. is connected to the corresponding one of the terminals 192 through 199 of the device H. The terminals 180c, 180c' and 180c" of Fig. 9 are separately connected to the instrument H.

Figure 10:
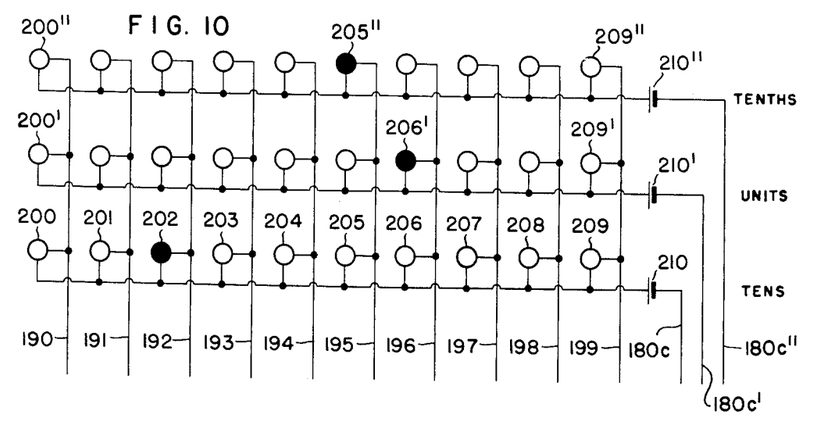
Fig. 10 is a diagram illustrating the use of the apparatus shown in Figs. 8 and 9 in controlling devices not shown in those figures.

The instrument H includes means for selectively energizing a different relay element included in the instrument when each of the terminals or circuit branches 180 through 189, 180' through 189', or 180" through 189" is operatively connected to the corresponding conductor 180c, 180c', or 180c" of the devices 131, 132, and 133. One simple circuit arrangement for effecting this result is illustrated in Fig. 10. In the Fig. 10 arrangement, each of ten devices 200 through 209 has one terminal connected to the conductor 180c in series with a source of current shown as a battery 210, and has a second terminal connected to a corresponding one of the ten conductors 190 through 199. Similarly, each of ten devices 200' through 209' has one terminal connected to the conductor 180c' in series with a source of current 210', and has a second terminal connected to a corresponding one of the conductors 190 through 199. Finally, each of ten devices 200" through 209" has one terminal connected through a source of current 210" to the conductor 180c", and has a second terminal connected to a corresponding one of the conductors 190 through 199.

Although the conductors 190 through 199 are each connected to branch terminals of each of the units 131, 132, and 133, the energization of none of the devices 200 through 209 of Fig. 10 can be effected except when the conductor 180c is connected through one of the branch conductors 180 through 189 in the device 131 to a corresponding one of the conductors 190 through 199. Similarly, no one of the devices 200' through 209' can be energized except when the conductor 180c' is connected through one of the conductors 180' through 189' in the unit 132 to one of the conductors 190 through 199. Finally, no one of the devices 200" through 209" can be energized except when the conductor 180c" is connected through one of the conductors 180" through 189" in the unit 133 to one of the conductors 190 through 199. In consequence, only one of the devices 200 through 209, only one of the devices 200' through 209', and only one of the devices 200" through 209" can be energized at any one time.

In Fig. 10, the devices 202, 206' and 205" have been shown solidly filled-in to illustrate a combination of energized devices representative of a particular value of a quantity measured by the associated apparatus. The particular value illustrated is 26.5, which might well represent a measured temperature of 26.5° F., or a measured flow rate of 26.5 gallons per minute. If the value of the quantity so measured were only 6.5, the devices 200, 206' and 205" would be energized, giving a representation of the number 06.5. Similarly, if the value of the quantity measured were so small that its value could be indicated by the number 0.5, the devices 200, 200′, and 205″ would then be energized.

The terminals 190 through 199, 180c, 180c′ and 180c″ shown in Fig. 9 may be included in the apparatus shown in Fig. 1, and in such case they will all be included in one of the cables g. The instrument H will then include four sets of devices 200 through 209″ and four sets of terminals 180c, 180c′, and 180c″.

Figure 11:
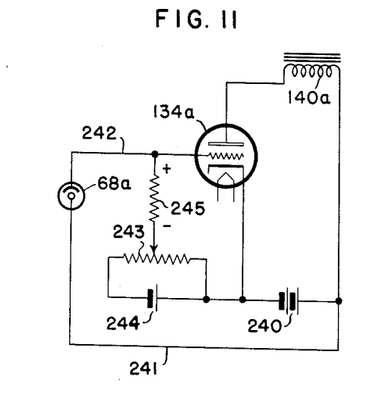
Fig. 11 is a diagram illustrating in greater detail a portion of the apparatus shown in Fig. 8.

In practice, each of the apparatus units shown diagrammatically in Fig. 8 as comprising a light sensitive element 68, an amplifier 134, and a relay winding 140 through 149 may well be of the form shown in Fig. 11, and comprises a photocell 68a, a triode 134a, a relay coil 140a, and circuit connections. As shown, the latter include a plate current source 240, herein shown as a battery, connected in series with the relay coil 140a between the anode and the cathode of the triode valve 134a, a conductor 241 connecting the anode of the photocell 68a to the connected terminals of the coil 140a and current source 240, a conductor 242 connecting the cathode of the photocell 68a to the control grid of the valve 134a, and a biasing connection between the grid and the cathode of the triode 134a. This biasing connection comprises a voltage divider resistor 243 connected across a biasing battery 244 which has its positive terminal connected to the cathode of the triode 134a. A resistor 245 has one end connected to the conductor 242, and has a second end connected to a slider contact which is in engagement with, and is adjustable along, the length of the resistor 243.

In the contemplated operation of the apparatus shown in Fig. 11, the relay winding 140a is not energized when the photocell 68a is not illuminated. However, when light illuminates the photocell 68a, a direct current is caused to flow through the resistor 245 and voltage divider 243 between the anode and cathode of the photocell. This produces a potential drop in the resistor 245 which increases the potential of the control grid of the triode 134a relative to the cathode of the triode and thus increases the plate current of the latter sufficiently to energize operatively the relay winding 140a, whereby the corresponding movable switch element 162 of Fig. 8 is shifted out of engagement with the stationary contact 163 and into engagement with the stationary contact 161. When the illumination of the photocell 68a of Fig. 11 is interrupted, the plate current of the triode 134a ceases to energize operatively the relay 140a.

Arrangements of the rotatable disc orifices and associated blinder orifices of various forms differing from those shown in Figs. 5, 6, and 7 may be used. Thus, for example, in the disc GA shown in Figs. 12 through 14, the ten 10% orifices 70 through 79 and the radial row of 10% blinder orifices 80 through 89 of Fig. 5 are replaced by a single disc orifice 215 and by ten blinder orifices 220 through 229 in a blinder plate 65A. Also in the disc GA shown in Figs. 12 through 14, the ten groups of ten 1% orifices 90 through 99 and the associated radial row of 1% blinder orifices 100 through 109 of Fig. 5 are replaced by a row of disc orifices 230 through 239 and a cooperating group of blinder orifices 240 through 249. As shown, the disc GA is like the disc G in that it is divided into ten similar sectors 70′ through 79′, each of 32° angular extent.

Figure 12:
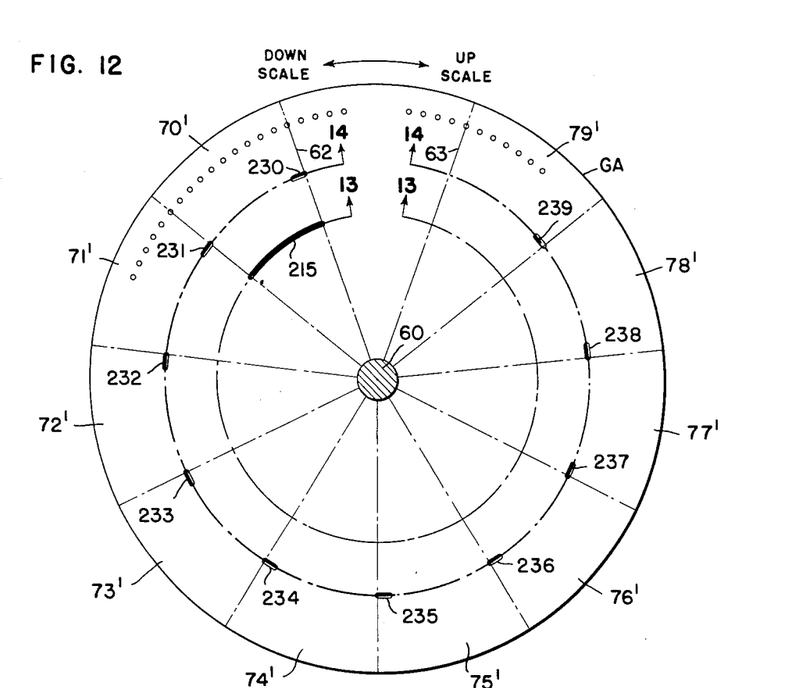
Fig. 12 illustrates a modification of the rotatable disc element shown in Fig. 5.
Figure 13:
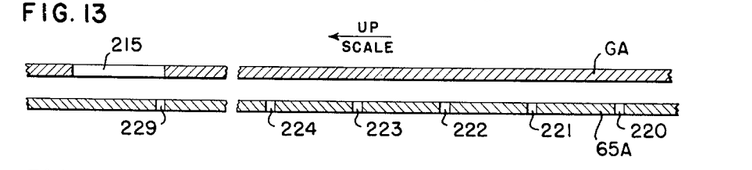
Figs. 13 and 14 are developed sections on the lines 13—13 and 14—14 of Fig. 12, respectively.

The single orifice 215 is in the form of an arc shaped slot which is concentric with the center of the disc GA and extends between and slightly overlaps the radial side edges of the sector 70′, which sector is adjacent the leading edge 62 of the operating portion of the disc GA. As shown in Fig. 13, the blinder orifices 220 through 229 are arranged along an arc which is concentric with the disc. The orifices 220 through 229 are angularly spaced 32° apart about the disc and blinder centers.

The disc apertures 230 through 239 are spaced 32° apart along an arc extending about the disc center from the leading edge 62 of the sector 70′ into the sector 79′.

The blinder orifices 240 through 249 are arranged at equal distances of 3.2° apart along an arc 28.8° long which is located adjacent the arc of orifices 230 through 239. Assuming that the disc GA is shown in the full-scale position in Figs. 12 through 14, the orifices 240 through 249 would extend clockwise in the blinder 65A from the radial line 63 for an arc distance of 28.8°.

Figure 14:
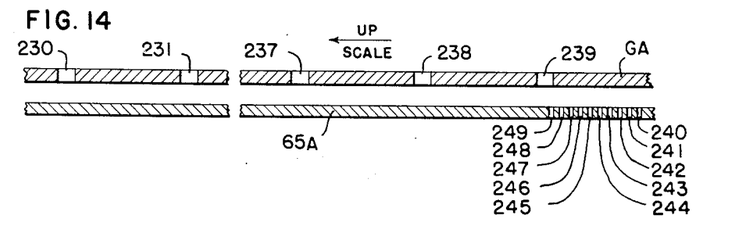

Relay circuits may be individually associated with the different blinder orifices of Figs. 12 through 14 as they are with the apparatus shown in Figs. 5 and 6, and all of the general apparatus results obtainable with the apparatus shown in Figs. 5 and 6 are obtainable with the different apparatus shown in Figs. 12 through 14.

As the disc GA moves from its starting or zero-scale position to its final or full-scale position, shown in Figs. 12 through 14, the 10% orifice 215 successively transmits light through each of the blinder orifices 220 through 229. As the orifice 215 moves through the position in which its ends are partly in register with each blinder orifice of an adjacent pair of such orifices, light is transmitted through both orifices to energize momentarily the corresponding pair of relays 140 through 149. As was the case with the arrangement of Figs. 5 and 6, however, such energization of two adjacent relays causes the illumination of only the lamp representing the higher of the two digits involved.

As the disc GA turns 32° clockwise away from its starting position, the orifice 230 successively passes into full register with each of the blinder orifices 240 through 249. Just before the disc orifice 230 moves out of register with the blinder orifice 249, the disc orifice 231 moves into register with the blinder orifice 240, and subsequently each of the disc orifices 232 through 239 moves into and then out of register with the orifices 240 through 249. Suitable stop means, not shown, prevents rotation of the disc GA past the full-scale position shown in Figs. 12 through 14, and hence prevents the disc orifice 239 from passing out of register to the left of the blinder orifice 249. Each disc orifice 230 through 239 thus cooperates with the ten blinder orifices 240 through 249 to produce one group of ten 1% digits. As shown, the disc GA is like the disc G in having one hundred and nine 0.1% orifices placed 3.2° apart adjacent the periphery of the disc. Those apertures may be associated with a group of blinder apertures as shown in Figs. 5 and 7 for the 0.1% actuation.

With the arrangement shown in Figs. 12 through 14, the number of disc orifices required for indicating the units and tens digits of the measured numbers is reduced from 110 to 11 with no material difference in operating results. The arrangement of Figs. 12 through 14 does, however, require that the photocells and light source for the 10% actuation be spaced over a greater area than is required for the apparatus of Figs. 5 and 6.

As those skilled in the art will recognize, the perforated disc and blinder plate elements hereinbefore described and illustrated can, if desired, be replaced by corresponding elements formed of a transparent material such as Lucite, provided that these new elements are made non-transparent, as by the use of an opaque paint, at all points except those corresponding to the apertures in the perforated elements previously described.

It is possible, and may be advantageous in some cases, to modify the apparatus hereinbefore described by making the disc G of unperforated, transparent material, such as Lucite, and by covering with opaque material the portions of the disc corresponding in shape and disposition to the orifice in the disc shown in Figs. 5 or 12. The blinder plate for use with such a disc would be identical to one or the other of the plates 65 and 65A.

Figure 15:
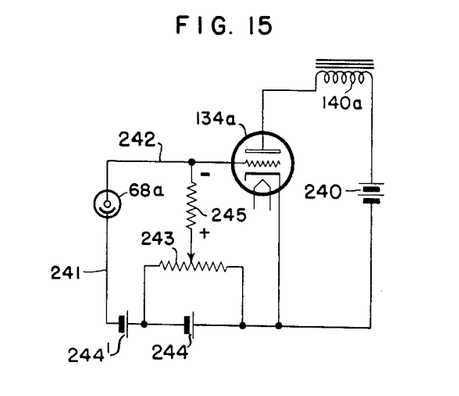
Fig. 15 illustrates a modification of the circuit shown in Fig. 11 including a reverse-acting relay.

The same general operating results are obtainable with such a transparent, non-apertured disc as with the discs G and GA, formed with orifices as hereinbefore described, provided that suitable changes are made in the light responsive mechanism through which the indicating and transmitting apparatus is actuated through the registering disc and blinder orifices or elements. The replacement of the opaque disc having orifices by a transparent disc without orifices but having opaque portions in lieu of orifices need require no significant change in the associated apparatus other than the replacement of the "forward" type of relay circuit, such as that shown in Fig. 11, by a "reverse" type of relay circuit, an example of which is shown in Fig. 15. The circuit shown in Fig. 15 differs essentially from that shown in Fig. 11 only in the reversal of the terminals of the photocell 68a connected to the control grid and cathode of the triode 134a, and in the addition to the photocell circuit of a suitable biasing battery 244'. The effect of the reversal is to reverse the voltage drop in the resistor 245 and thus decrease the potential of the control grid of the triode 134a relative to the cathode of the triode when light strikes the photocell 68a of Fig. 15. The circuit shown in Fig. 15 is so proportioned and arranged that when no light strikes the photocell 68a and no effective current flows through the resistor 245, the potential of the control grid of the valve 134a is such that the valve is conductive and effects the energization of the relay 140a. The reverse type relay circuit shown in Fig. 15 has the operating characteristics needed for its use with apparatus in which the disc G is transparent and transmits light to each light sensitive element 68a continuously, except during the periods in which no light is transmitted through opaque portions of the disc.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In apparatus for use in measuring the conjoint effect of a plurality of separately measurable variable quantities and comprising computing means associated with and jointly responsive to measurements of said quantities, the combination comprising a separate measuring device individual to each of said quantities and adapted to be actuated in accordance with the value of the corresponding one of said quantities, each of said measuring devices including a responsive portion having an input portion adapted to have applied thereto an effect dependent upon the value of the corresponding quantity, having an output portion, and being operative to produce in said output portion an electrical output signal under the control of said value, each of said measuring devices also including electric motor means responsive to said signal and electromechanical translating means operable under the control of said motor means to produce a group of a plurality of electrical digit signals, each one of which digit signals is representative of a respective one of the digits of the multi-digit number corresponding to the numerical form of said value, a plurality of digital means including a separate digital means individual to each of said quantities and responsive to the group of digit signals representing the numerical value of the corresponding quantity, each of said digital means including a separate group of devices individual to each of the digits making up the numerical value of the corresponding quantity and being operative under the control of the respective one of said groups of digit signals to provide a digital representation of the value of the corresponding one of said quantities, and means responsive to the digital representations of said digital means and operative to provide a measure of the conjoint effect of the values of said quantities according to a predetermined mathematical relationship between said quantities for connecting said measuring devices to said computing means.

2. Apparatus as specified in claim 1, wherein each of said measuring devices is a self-balancing measuring instrument, wherein the responsive portion of each of said measuring devices comprises a balanceable network adapted to be unbalanced by changes in the value of the corresponding one of said quantities and operative, when unbalanced, to cause the associated output signal to control the operation of the associated motor means as necessay to rebalance said network, and wherein said operation of said associated motor means adjusts the associated translating means in accordance with the value of the corresponding one of said quantities.

3. Apparatus as specified in claim 2, wherein each of said translating means includes a relatively stationary means and cooperating means movable relative to said stationary means under the control of the associated motor means, and wherein the position of said movable means relative to said stationary means controls the production of the associated group of said digit signals.

4. Apparatus as specified in claim 3, wherein at least one of said effects applied to said input portions of said measuring devices varies in a predetermined non-linear manner with changes in the value of the corresponding one of said quantities, and wherein the balanceable network of each of said measuring devices is constructed and arranged to cause the associated motor means to position the associated movable means relative to the cooperating stationary means in linear accordance with the value of the corresponding one of said quantities.

5. Apparatus as specified in claim 1, wherein each of said translating means includes a relatively stationary, disc-like blinder member, a disc-like control member arranged for coaxial rotation relative to said blinder member and adapted to be rotated relative to said blinder member under the control of the associated motor means, a source of illumination, and light sensitive means comprising a separate group of light sensitive devices individual to each of the digits making up the numerical value of the corresponding one of said quantities and operative to control the production of the corresponding one of said digit signals, and wherein said blinder and control members included in each of said translating means are provided with light controlling elements which are operative to cooperate with one another and with the corresponding source of illumination and light sensitive means to cause the corresponding group of digit signals to be representative of the value of the corresponding one of said quantities.

6. Apparatus as specified in claim 5, wherein each of said groups of light sensitive devices includes ten photocells, each of which is individual to one of the values of zero through nine which the corresponding digit may assume, and wherein each of said groups of ten photocells controls the production of the corresponding one of said digit signals as necessary to cause that signal to be representative of the value of the corresponding digit.

7. Apparatus as specified in claim 6, wherein each of said blinder members is provided with a separate group of ten of said light controlling elements individual to each of the digits of the numerical value of the quantity individually associated with the blinder member, wherein each of said control members is provided with a separate group of said light controlling elements individual to each of the digits of the value of the quantity individually associated with the control member, and wherein the light controlling elements and the photocells individual to each of said digits cooperate to cause the corresponding digit signal to be representative of the value of the digit.

8. Apparatus as specified in claim 5, wherein said light controlling elements are orifices provided in said blinder and control members, wherein the blinder member of each of said translating means is provided with three groups of said orifices, each of which groups includes ten of said orifices and is individual to a corresponding one of the tens, units, and tenths digits of the numerical value of the corresponding one of said quantities, each of the orifices of each of said groups being individual to one of the values of zero through nine which the corresponding digit may assume, wherein said light sensitive means includes a separate photocell individual to each of said blinder member orifices, wherein the control member of each of said translating means is provided with three groups of said orifices, each of which groups cooperates with a corresponding one only of the groups of orifices in the corresponding one of said blinder members, and wherein an increase in the value of any of said quantities within the range of measurement thereof is operative to cause operation of the corresponding motor means and rotation of the corresponding control member as necessary to cause the orifices of the last mentioned control member to register successively with corresponding orifices of the cooperating blinder member representative of increased digital values and hence to effect successive illumination of the corresponding photocells until the three photocells respectively corresponding to the tens, units, and tenths values of the then existing value of the quantity are operatively illuminated.

9. Apparatus as specified in claim 5, wherein said light controlling elements are orifices provided in said blinder and control members, wherein the blinder member of each of said translating means is provided with three groups of said orifices, each of which groups includes ten of said orifices and is individual to a corresponding one of the tens, units, and tenths digits of the numerical value of the corresponding one of said quantities, each of the orifices of each of said groups being individual to one of the values of zero through nine which the corresponding digit may assume, wherein said light sensitive means includes a separate photocell individual to each of said blinder member orifices, wherein the control member of each of said translating means is provided with three groups of said orifices, each of which groups cooperates with a corresponding one only of the groups of orifices in the corresponding one of said blinder members, wherein each of said control members is operatively rotated about its axis by the corresponding motor means in linear proportion to changes in the value of the corresponding quantity, and is divided into ten similar sectors, each of which has an equal angular extent of less than 36°, wherein each of said sectors contains one of said tens control member orifices, ten of said units control member orifices, and ten of said tenths control member orifices, each of said tens control member orifices extending arcuately throughout its corresponding sector and being at a greater radial distance from the center of the control member than the preceding tens orifice, the units control member orifices of each group thereof being evenly spaced throughout the corresponding sector and each orifice being at a greater radial distance from said center than the preceding units orifice within that sector, the units orifice in each sector corresponding to the same value of the units digit being at the same radial distance from said center, and each of said tenths control member orifices of each group thereof being evenly spaced along an arc throughout the corresponding sector at a different radial distance from said center from that occupied by said tens and units orifices, and wherein said tens blinder member orifices are evenly spaced on a radial line segment coincident with the radial line segment embracing said tens control member orifices, said units blinder member orifices are evenly spaced on a radial line segment coincident with the radial line segment embracing said units control member orifices, and said tenths blinder member orifices are evenly spaced along an arc coincident with the arc of the tenths control member orifices and at a distance apart equal to 1.1 times the distance between said tenths control member orifices.

10. Apparatus as specified in claim 5, wherein each of said groups of devices included in each of said digital means comprises a group of ten relay devices, each of which is individual to one of the values of zero through nine which the corresponding digit may assume, wherein there is included a separate coupling means between each of said relay devices and the one of said light sensitive devices which is individual to the corresponding value of the corresponding digit, whereby each of said relay devices is operatively energized under the control of only the corresponding one of said light sensitive devices by means of the corresponding one of said digit signals, and wherein said relay devices of each of said groups are so operatively interconnected that, upon the energization of more than one of the relay devices of the group, the numerical representation provided for the digit corresponding to that group will be that associated with the one of the energized relay devices which corresponds to the highest numerical value.

11. Apparatus as specified in claim 10, wherein each of said digital means includes a plurality of indicating lamps, each of which is individually associated with and is operatively connected to a corresponding one of said relay devices, each of said lamps thereby corresponding to one of the values of zero through nine which corresponds to the associated relay device, and wherein each group of ten of said lamps which is associated with one of said groups of said relay devices is operative under the control of the latter to provide an indication of the numerical value of the corresponding digit, said indication being provided by the illumination of only the particular lamp in the group corresponding to the energized relay device of highest numerical value in the corresponding group of relay devices.

12. Apparatus for the conversion of measured values into numerical, digital form, comprising a measuring device adapted to be actuated in accordance with the value of a quantity and including a responsive portion having an input portion adapted to have applied thereto an effect dependent upon the value of the quantity, having an output portion, and being operative to produce in said output portion an electrical output signal under the control of said value, said measuring device also including electric motor means responsive to said signal and electromechanical translating means operable under the control of said motor means to produce a group of electrical digit signals, each one of which digit signals is representative of a respective one of the digits of the multi-digit number corresponding to the numerical form of said value, said translating means including a relatively stationary, disc-like blinder member provided with three groups of orifices, each of which groups includes ten of said orifices and is individual to a corresponding one of the tens, units, and tenths digits of the numerical value of said quantity, each of the orifices of each of said groups being individual to one of the values of zero through nine which the corresponding digit may assume, a disc-like control member arranged for coaxial rotation relative to said blinder member and adapted to be rotated relative to said blinder member under the control of said motor means, said control member being provided with tens, units, and tenths groups of orifices, each of which groups cooperates with a corresponding one only of said tens, units, and tenths groups of orifices in said blinder member, and being divided into ten similar sectors, each of which has an equal angular extent of less than 36°, each of said sectors containing one of said tens control member orifices, ten of said units control member orifices, and ten of said tenths control member orifices, each of said tens control member orifices extending arcuately throughout its corresponding sector and being at a greater radial distance from the center of the control member than the preceding tens orifice, the units control member orifices of each group thereof being evenly spaced throughout the corresponding sector and each orifice being at a greater radial distance from said center than the preceding units orifice within that sector, the units orifice in each sector corresponding to the same value of the units digit being at the same radial distance from said center, and each of said tenths control member orifices of each group thereof being evenly spaced along an arc throughout the corresponding sector at a different radial distance from said center from that occupied by said tens and units orifices, said tens blinder member orifices being evenly spaced on a radial line segment coincident with the radial line segment embracing said tens control member orifices, said units blinder member orifices being evenly spaced on a radial line segment coincident with the radial line segment embracing said units control member orifices, and said tenths blinder member orifices being evenly spaced along an arc coincident with the arc of the tenths control member orifices and at a distance apart equal to 1.1 times the distance between said tenths control member orifices, a source of illumination, and light sensitive means including a separate photocell individual to each of said blinder member orifices, said orifices being operative to cooperate with one another and with said source of illumination and said light sensitive means to cause said group of digit signals to be representative of the value of said quantity, and digital means responsive to said digit signals representing the numerical value of said quantity, said digital means including a separate group of devices individual to each of the digits making up the numerical value of said quantity and being operative under the control of said group of signals to provide a digital representation of the value of said quantity.

13. Apparatus as specified in claim 12, wherein said measuring device is a self-balancing measuring instrument, wherein the responsive portion of said measuring device comprises a balanceable network adapted to be unbalanced by changes in the value of said quantity and operative, when unbalanced, to cause said output signal to control the operation of said motor means as necessary to rebalance said network, and wherein said operation of said motor means adjusts said control member of said translating means in accordance with the value of said quantity.

14. Apparatus as specified in claim 13, wherein said effect applied to said input portion of said measuring device varies in a predetermined non-linear manner with changes in the value of said quantity, and wherein said balanceable network of said measuring device is constructed and arranged to cause said motor means to position said control member relative to said blinder member in linear accordance with the value of said quantity.

15. Apparatus as specified in claim 12, wherein each of said groups of devices included in each of said digital means comprises a group of ten relay devices, each of which is individual to one of the values of zero through nine which the corresponding digit may assume, wherein there is included a separate coupling means between each of said relay devices and the one of said photocells which is individual to the corresponding value of the corresponding digit, whereby each of said relay devices is operatively energized under the control of only the corresponding one of said photocells by means of the corresponding one of said digit signals, and wherein said relay devices of each of said groups are so operatively interconnected that, upon the energization of more than one of the relay devices of the group, the numerical representation provided for the digit corresponding to that group will be that associated with the one of the energized relay devices which corresponds to the highest numerical value.

16. Apparatus as specified in claim 15, wherein each of said digital means includes a plurality of indicating lamps, each of which is individually associated with and is operatively connected to a corresponding one of said relay devices, each of said lamps thereby corresponding to one of the values of zero through nine which corresponds to the associated relay device, and wherein each group of ten of said lamps which is associated with one of said groups of said relay devices is operative under the control of the latter to provide an indication of the numerical value of the corresponding digit, said indication being provided by the illumination of only the particular lamp in the group corresponding to the energized relay device of highest numerical value in the corresponding group of relay devices.

References Cited in the file of this patent

UNITED STATES PATENTS

| | | |
|---|---|---|
| 2,243,730 | Ellis | May 27, 1941 |
| 2,258,859 | Mitelman | Oct. 14, 1941 |
| 2,376,234 | De Castro | May 15, 1945 |
| 2,442,098 | Shewell et al. | May 25, 1948 |
| 2,503,868 | Gaumer et al. | Apr. 11, 1950 |
| 2,566,947 | Luhn | Sept. 4, 1951 |
| 2,591,448 | Lorenz | Apr. 1, 1952 |

FOREIGN PATENTS

| | | |
|---|---|---|
| 924,800 | France | Aug. 14, 1947 |
| 502,560 | Great Britain | Mar. 20, 1939 |